Feb. 7, 1928.
E. H. THOMPSON ET AL
1,658,065
FARE BOX
Filed March 26, 1923 10 Sheets-Sheet 1
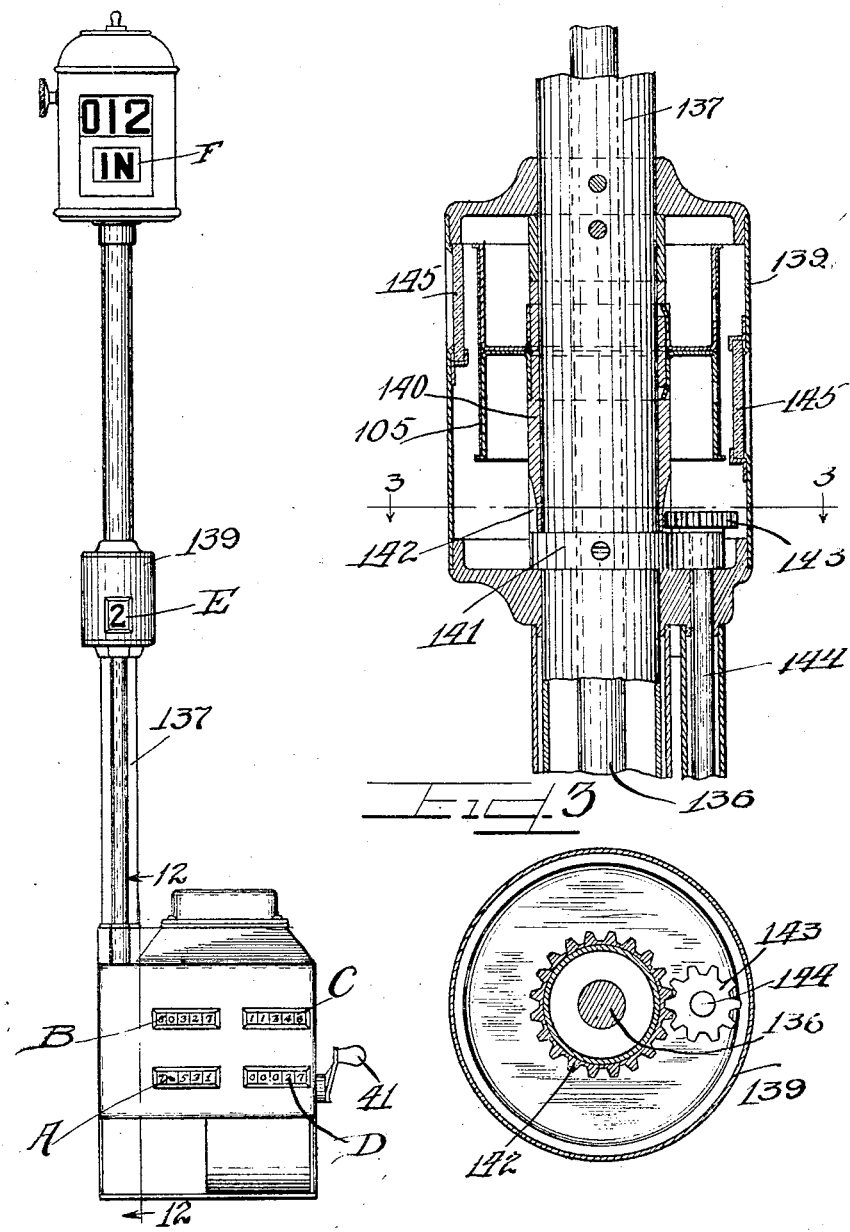

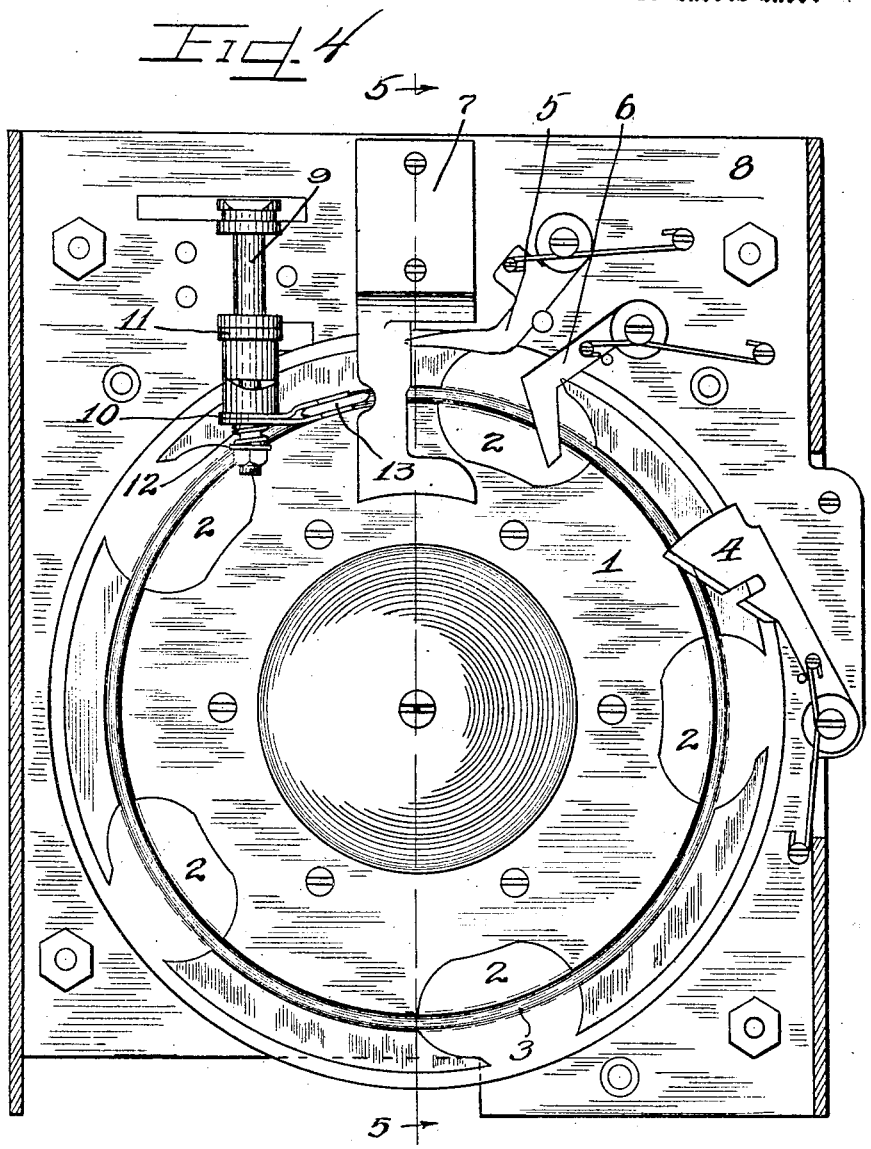

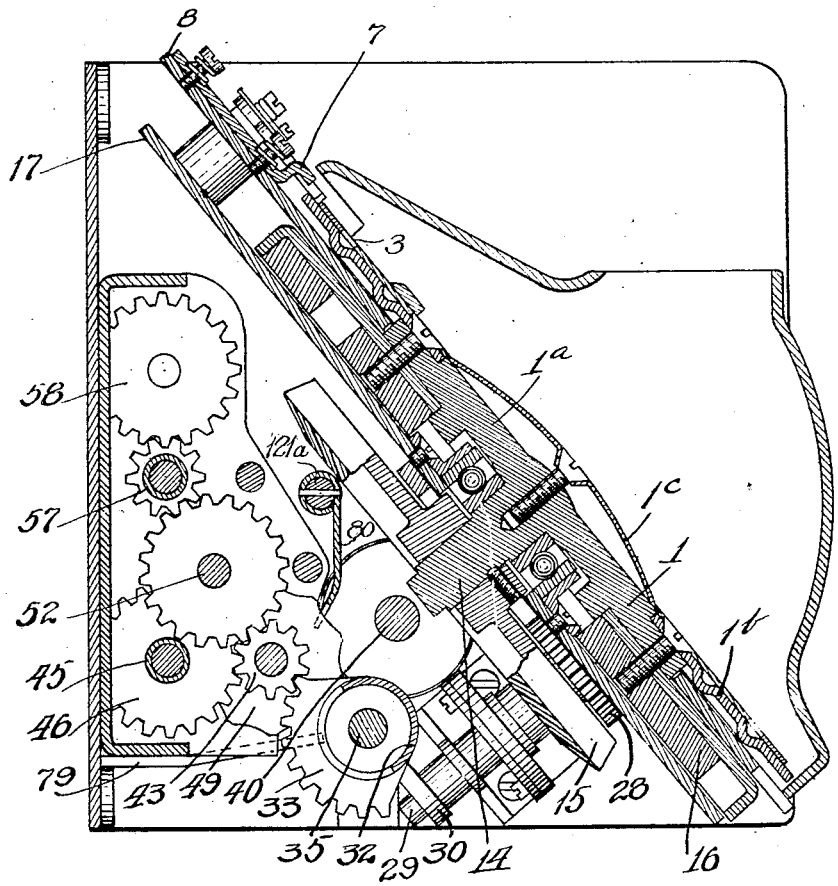

Feb. 7, 1928.

E. H. THOMPSON ET AL 1,658,065

FARE BOX

Filed March 26, 1923    10 Sheets-Sheet 4

Witnesses
Rudolph T. Berg.
Caserin Hill

Inventors
Hugo J. Baur
Ernest H. Thompson
By Charles Hill
Atty

Feb. 7, 1928.
E. H. THOMPSON ET AL
1,658,065
FARE BOX
Filed March 26, 1923 10 Sheets-Sheet 5
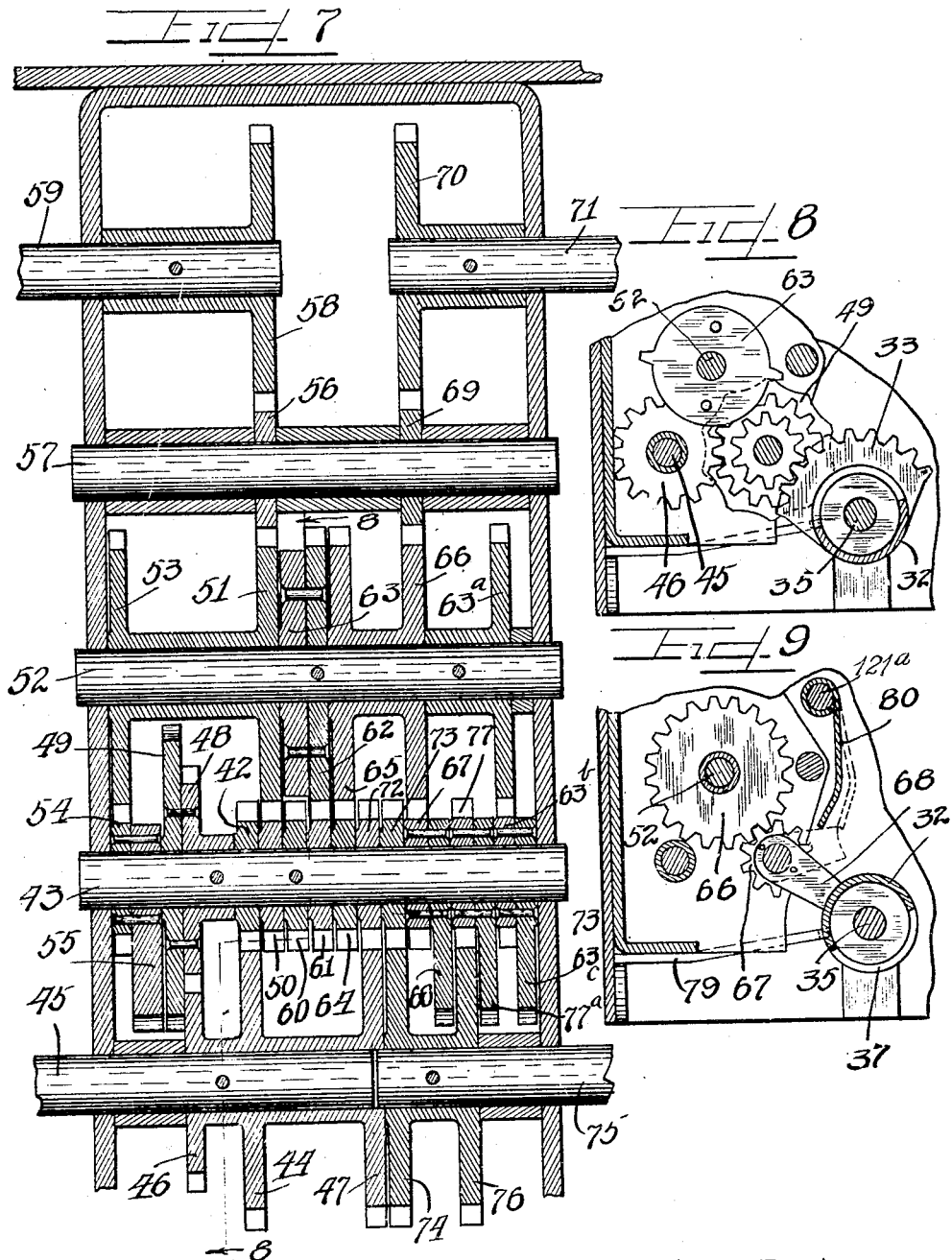

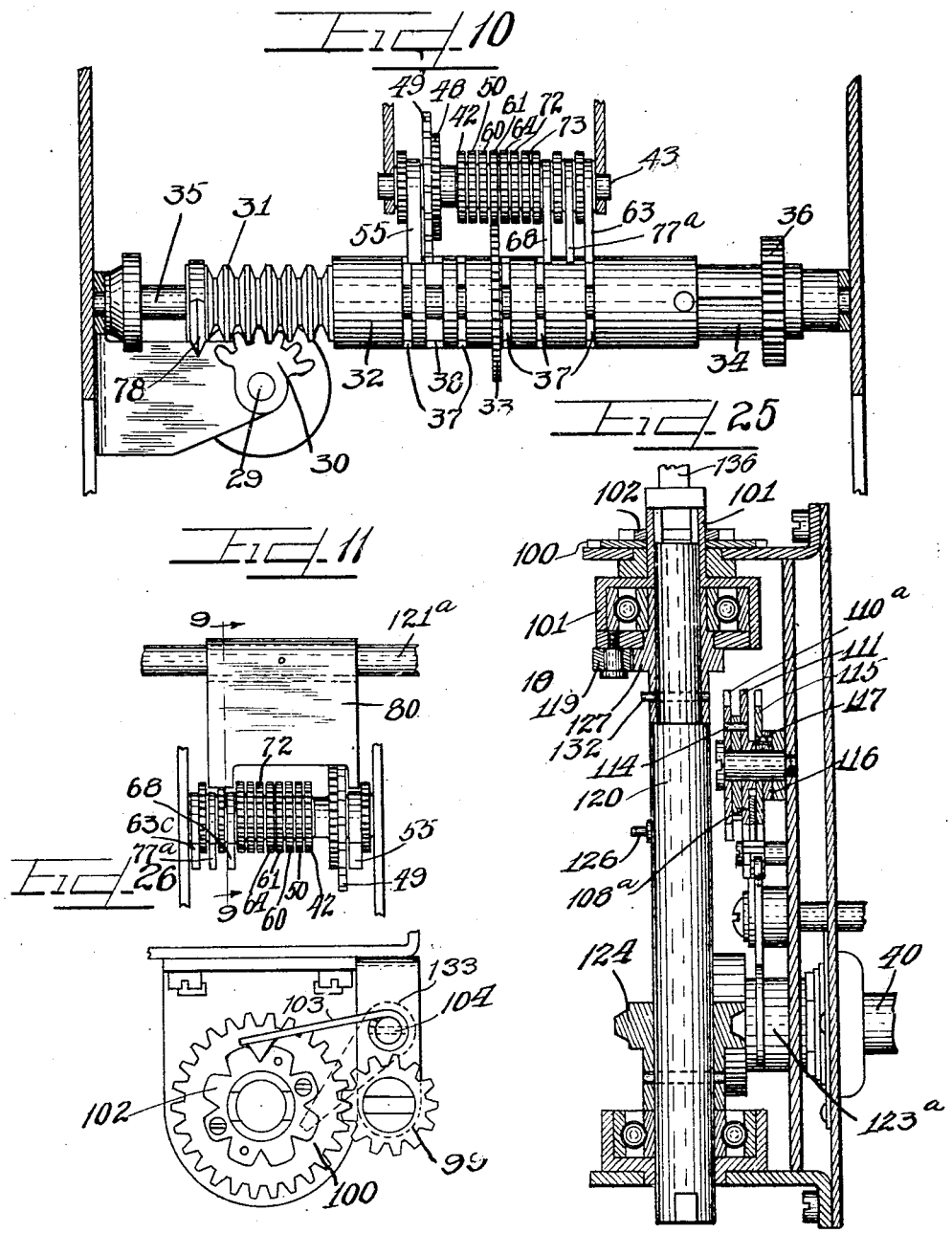

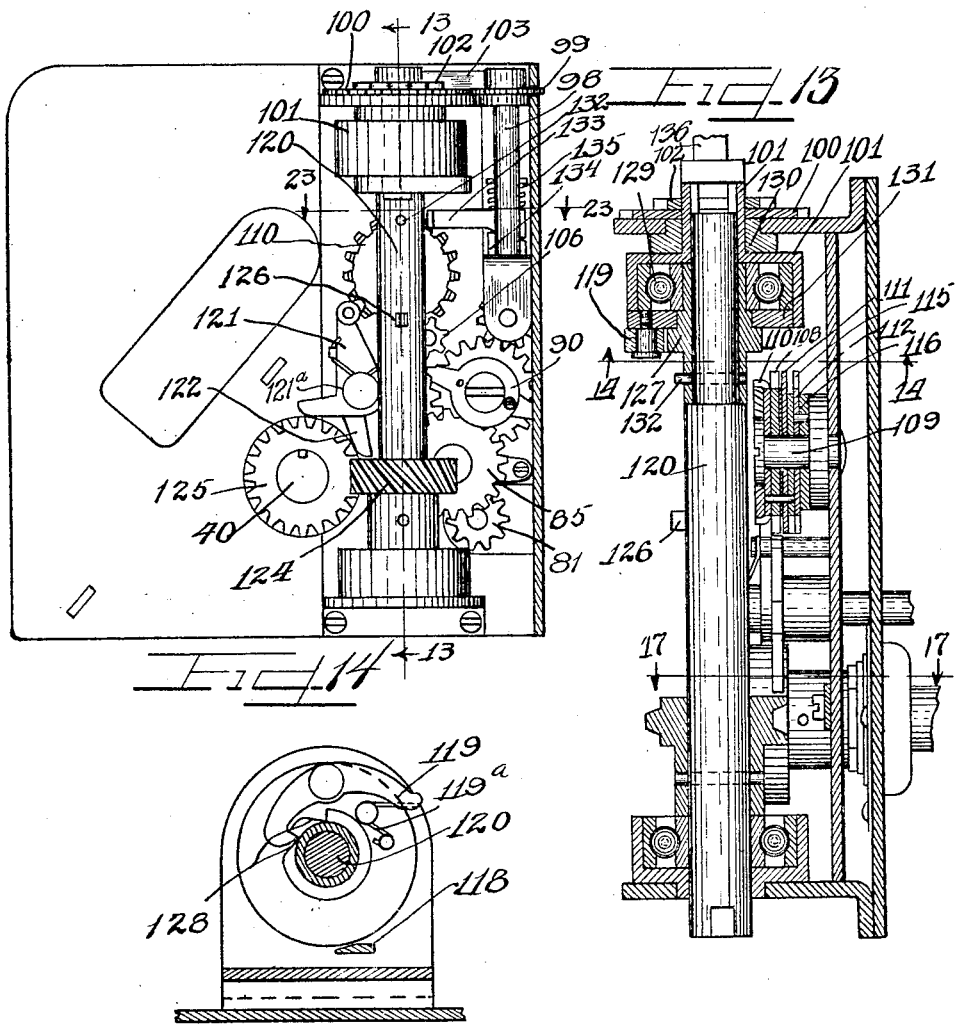

Feb. 7, 1928.
E. H. THOMPSON ET AL
1,658,065
FARE BOX
Filed March 26, 1923    10 Sheets-Sheet 8
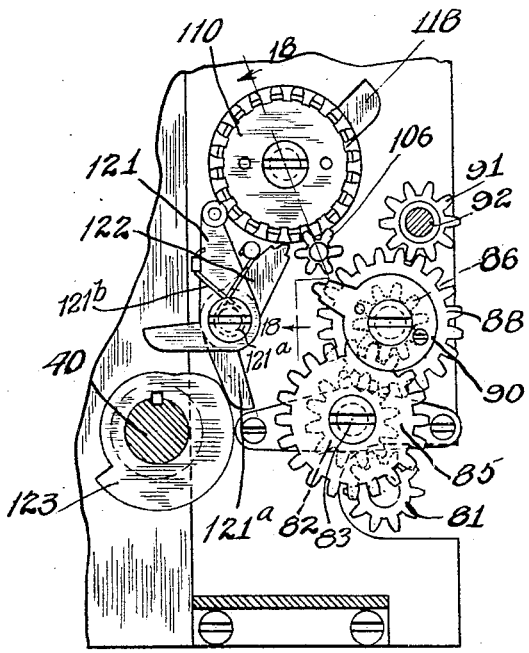
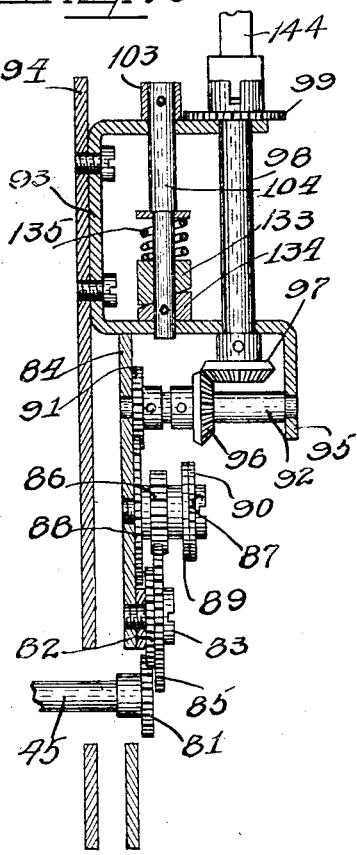
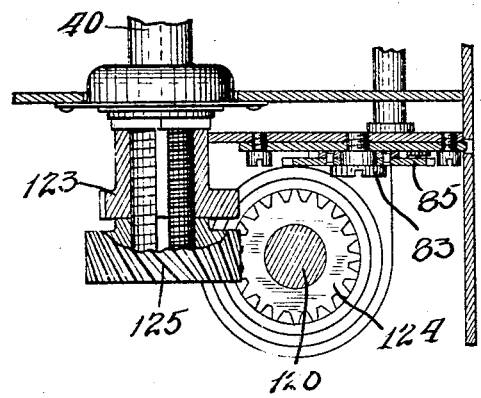

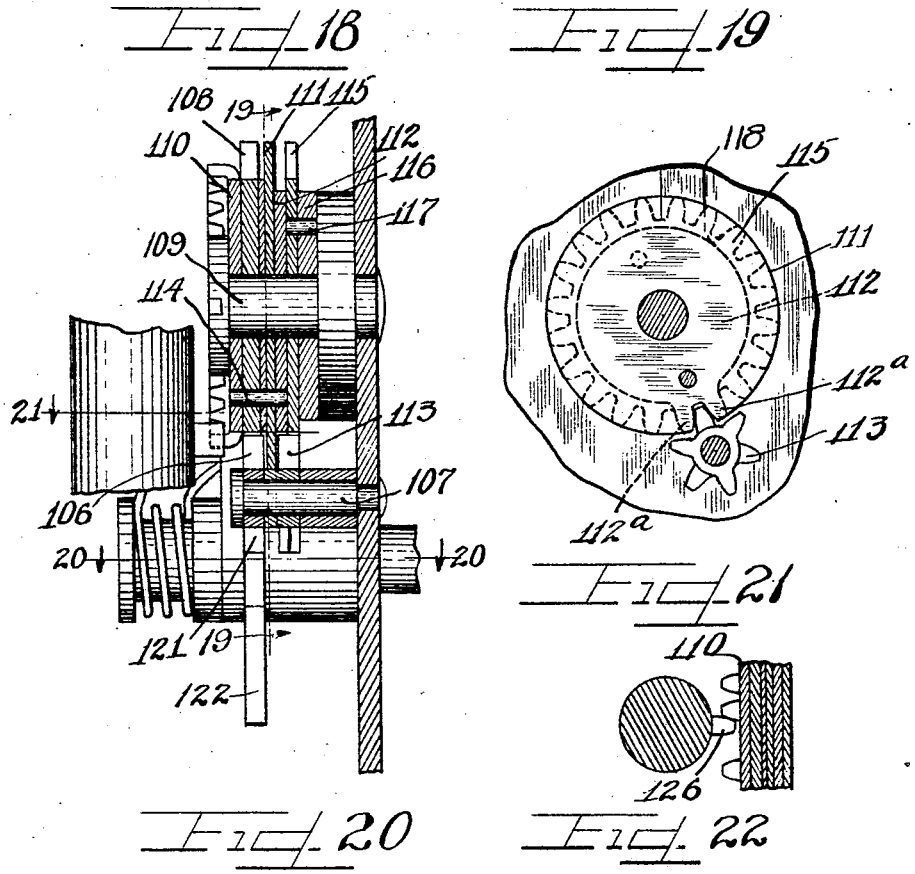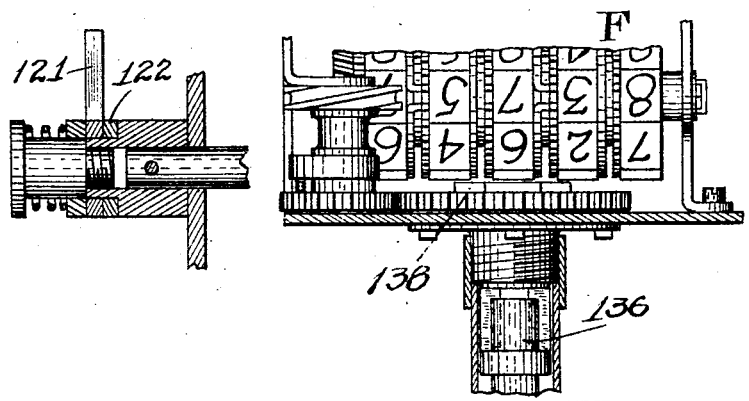

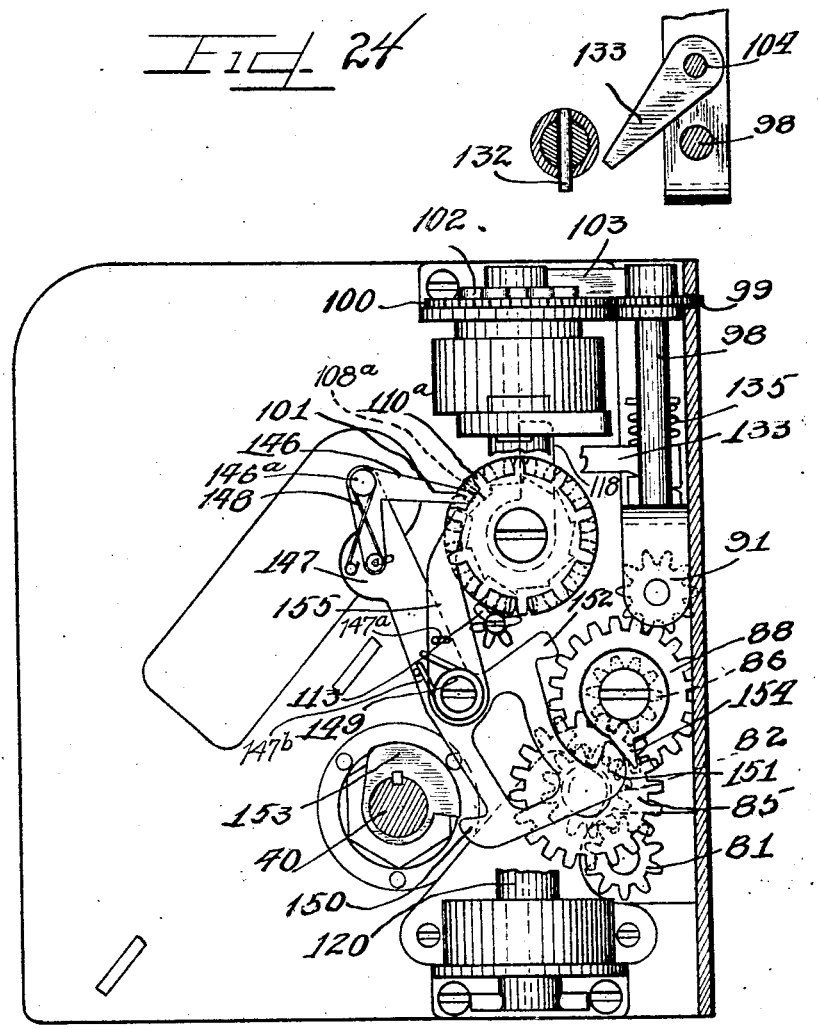

Patented Feb. 7, 1928.

1,658,065

UNITED STATES PATENT OFFICE.

ERNEST H. THOMPSON AND HUGO J. BAUR, OF CHICAGO, ILLINOIS, ASSIGNORS TO JOHNSON FARE BOX COMPANY, A CORPORATION OF ILLINOIS.

FARE BOX.

Application filed March 26, 1923. Serial No. 627,700.

This invention relates to a fare box for receiving different coins and tokens and registering the cash and tokens separately in combination with mechanism for registering the number of fares deposited.

It is an object of this invention to provide mechanism that is operated by the registering mechanism of a fare box for registering the number of fares wherein the same involves a plurality of different coins or tokens, in which the mechanism is accumulative, normally locked against operation and simple in structure and operation.

It is broadly an object of this invention to provide mechanism in connection with a fare box for registering the number of fares so that an observer may readily see the number of fares paid, and any penny accumulations.

With these and other objects in view, which will become more apparent in the following description and disclosures in the drawings, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views:

Figure 1 is an elevational view of the fare box with the fare register.

Figure 2 is an enlarged sectional view through a portion of the registering mechanism with parts shown in elevation.

Figure 3 is a section on the line 3—3 of Figure 2.

Figure 4 is an enlarged plan view of the coin carrying disk showing the casing in section.

Figure 5 is an enlarged section through the fare box taken substantially upon the line 5—5 of Figure 4.

Figure 7 is an enlarged section through the gear casing illustrating the trains of gears for actuating the different registers.

Figure 8 is a reduced section upon the line 8—8 of Figure 7.

Figure 9 is a section upon the line 9—9 of Figure 11 with parts omitted.

Figure 10 is an enlarged elevational view of the selective gearing.

Figure 11 is an elevational view of the selective gears of the gear trains with a reversing stop.

Figure 12 is an enlarged section substantially upon the line 12—12 of Figure 1 with parts in elevation.

Figure 13 is an enlarged section upon the line 13—13 of Figure 12.

Figure 14 is a section upon the line 14—14 of Figure 13.

Figure 15 is an enlarged elevational view of the train of gearing for operating fare registering mechanism.

Figure 16 is a developed section of the gearing train for actuating certain registering mechanism.

Figure 17 is a section substantially upon the line 17—17 of Figure 13 with parts omitted.

Figure 18 is an enlarged section substantially upon the line 18—18 of Figure 15.

Figure 19 is a part sectional and part elevational view taken substantially upon the line 19—19 of Figure 18.

Figure 20 is a reduced section upon the line 20—20 of Figure 18.

Figure 21 is a section upon the line 21—21 of Figure 18.

Figure 22 is a section through the fare registering mechanism with parts in elevation.

Figure 23 is a reduced section upon the line 23—23 of Figure 12 with parts omitted.

Figure 24 is a section through the casing showing a modified form of mechanism in elevation for operating the fare register.

Figure 25 is a section similar to Figure 13 of the modified form of the invention.

Figure 26 is a top plan view of Figures 12 or 25 showing the centering mechanism.

Figure 6:
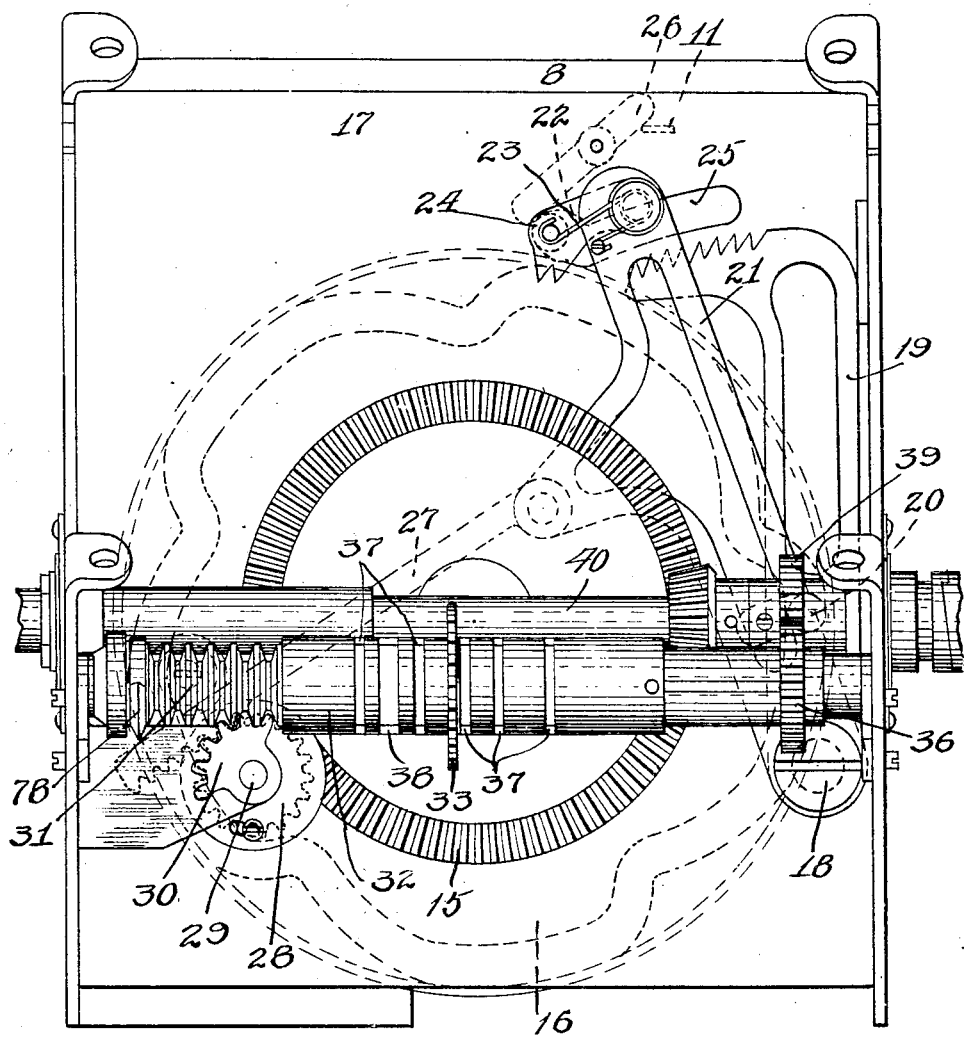
Figure 6 is an enlarged plan view of certain mechanism below the coin carrying disk looking from the rear of Figure 5.

In referring now to the drawings, it will be observed that Figure 1 illustrates a fare box adapted for receiving coins and tokens and registering the same; the box being provided with four sets of registering mechanism, observable through proper slots or windows. The window "A" shows the cash register, the window "B" shows the 65¢ tokens register, the window "C" shows the 78¢ and 25¢ registering mechanism and the window "D" shows the 90¢ token register. The gearing that operates the cash register is operatively connected to vertical shafts which operate a penny indicator "E" and the fare register "F", as will be later explained.

The mechanism for receiving and registering the coins and tokens forms no part of this invention except in combination therewith, as the same is shown and claimed in a copending application Serial No. 627,275, filed Mar. 24, 1923. This mechanism will be briefly described in order that the operation of this apparatus may be understood.

In Figure 4 is shown the inclined cam and token carrying disk 1 having pockets 2 for receiving the coins and tokens and a groove 3 concentric with the axis of the disk. A stripper bar 4 is yieldingly supported over the disk so as to strip the surplus coins or tokens from a pocket, and a pair of yieldingly pivoted guide elements 5 and 6 are superposed over the disk near its upper end. A yieldable guide plate 7 also extends over the coin disk. The stripper bar and guide elements are pivoted upon an inclined plate 8 secured diagonally across the casing. Adjacent the guide plate 7 is an upstanding U-shaped bracket upon the plate 8. A rod 9 is secured in this bracket and extends forwardly over the coin disk 1. A pair of levers 10 and 11 having opposed coacting cam hubs or faces are journalled upon the extended end of the rod 9 and yieldingly restrained from longitudinal movement by means of the spring 12 which will yield and allow relative rotation of the levers if there should be a jam in some part of the machine. The lever 10 projects over the groove in the coin disk; a roller 13 being journalled upon the end of said lever for operating in said groove. When the coin disk is revolved so that a coin in a pocket is forced under the roller 13, the lever 10 will be elevated, thereby actuating the lever 11 which extends through a slot in the plate 8 for a purpose to be later set forth.

In referring to Figure 5, it will be observed that the coin disk 1 comprises a central hub plate 1ª upon which a marginal ring plate 1ᵇ is secured and a sheet metal plate 1ᶜ having a central dome is affixed to the upper surface of the disk. The central hub plate 1ª fits in a circular recess in the plate 8, and is provided with a stub shaft 14 upon which a bevel gear 15 is secured. Upon the under side of the coin carrying disk, a cam disk 16 is secured having a cam groove provided with a plurality, five in the present instance, of similar portions for imparting a similar number of oscillations to a lever during one rotation thereof as will be later explained. Below the cam disk 16 is a supporting plate 17 extends diagonally of the casing and is secured to and supports a ball bearing for the stub shaft 14.

In referring to Figure 6, it will be noted that a pivot stud 18 is secured upon a lower side margin of the plate 17. A ratchet bar 19 is pivoted upon this stud and is provided at its upper end with a row of ratchet teeth, and intermediate its ends with a stud 20 which projects through an arcuate slot in the plate 17 and extends into the groove of the cam disk 16 for oscillation thereby. A lever 21 is also pivoted upon stud 18 at its lower end, and is provided at its upper end with a pawl 22 which is pivoted to a stud thereon. A spring 23 wound around said stud and anchored at one end to said lever and at its other end to said pawl is normally effective for holding said pawl above the arc of oscillation of said ratchet. A roller 24 is rotatable upon the end of said pawl and operates in an arcuate slot 25 in the plate 17. The forward end of the slot 25 is provided with an upwardly extending recess into which the roller 24 may be elevated by the spring 23. A lever 26 pivoted intermediate its ends upon the upper side of the plate 17 has one end in engagement with the roller 24 when the same is located in said recess; the other end of said lever 26 is normally in contact with the aforedescribed coin actuated lever 11. A rack bar 27 is connected to an intermediate point of the lever 21; the free end of said rack bar being provided with gear teeth normally in mesh with a gear 28 secured upon a shaft 29 upon the outer end of which there is secured a segmental gear 30 which meshes with bevelled circular ridges 31 upon a slidable sleeve 32. When a coin passes under the roller 13, the lever 11 will be actuated to move the lever 26 against the pawl 22 forcing the same into engagement with the ratchet teeth of the bar 19 which is oscillated by rotation of the cam disk, the exact point of engagement depending upon the size of the coin or token passing under the roller 13. As soon as the pawl is brought into engagement with the ratchet, the roller 24 will pass into the arcuate slot 25 and said pawl will be forced to remain in engagement with the ratchet. The point of engagement of the pawl with the ratchet naturally determines the throw of the lever 21 and hence the amount of rotation of the segment 30 and therefore the amount of sliding movement imparted to the selective gear sleeve 32 which is provided with a segmental gear 33 adapted to be brought into operative relation with different gear trains for actuating the different registering mechanism "A", "B", "C" and "D". In referring to Figure 10, it will be observed that the sleeve 32 is slidably splined upon a bushing 34 at one end and slidingly and rotatably mounted upon a shaft 35 at the other end which is suitably supported in the casing; the bushing being journalled upon said shaft 35 and provided with a gear 36 whereby the bushing and sleeve may be rotated. The sleeve 32 is provided with a plurality of spaced arcuate slots 37 and 38 for a purpose to be later set forth. The gear 36 meshes with a gear 39 on the crank shaft 40 which shaft is also provided with a bevel gear meshing with the gear 15 on the coin carrying disk. Rotation of the crank shaft 40 by means of the hand crank 41 will simultaneously rotate the coin carrying disk, cam 16 and the sleeve 32.

Now assuming that different coins and tokens have been deposited in the fare box through the hopper and rest upon the coin carrying disk which is being operated, and assuming that the various coins and tokens are brought up under the roller 13 in successively increasing thickness, the various trains of gears now to be described will be set in motion to operate the different registering mechanisms. While the mechanism may be designed with reference to any size coins or tokens, in the exemplification of this invention, the machine has been designed with reference to the following coins and token, namely, the Canadian nickel, a 65¢ token, a dime, a penny, a 78¢ token, or 25¢ piece, a U. S. nickel and a 90¢ token.

When the Canadian nickel passes under the roller 13, the sleeve 32 will be shifted to bring the segmental gear 33 thereon into mesh with a spur gear 42 (Figure 10) loosely mounted upon a shaft 43 journalled in a gear casing in the fare box. The gear 42 meshes with a gear 44 (Figure 7) upon a shaft 45 that actuates the cash register. The gear 44 is provided with an elongated hub having the terminal gears 46 and 47, the former of which meshes with a gear 48 fast on shaft 43 and having a locking disk 49 secured thereto which is normally locked against rotation by the sleeve 32 but which comes into alinement with an arcuate slot 37 (Figure 10) when the gears 42 and 33 are brought into mesh.

Now assume that a 65¢ token passes under the roller 13, the sleeve 32 will be shifted to bring the segmental gear 33 into mesh with the second spur gear 50 (Figure 10) that meshes with a gear 51 loosely mounted upon a shaft 52 (Figure 7). The gear 51 has an extended hub which is provided with a terminal gear 53 which meshes with a locking gear 54 loosely mounted upon shaft 43 and having a locking arm 55 that normally engages the sleeve 32, but which becomes alined with a slot in said sleeve when the gears 33 and 50 are in mesh to allow rotation of gear 51 which meshes with an idler gear 56 on a shaft 57 supported in said casing. The gear 56 drives gear 58 secured upon a shaft 59 which operates the 65¢ token register.

Now assume that a dime is the next to pass under the roller 13, the segmental gear 33 will be shifted into mesh with the third spur gear 60 which is fast upon the shaft 43 causing said shaft to rotate and imparting rotation to cash register shaft 45 through the intermeshing gears 46 and 48 which will have been unlocked by an opposite slot in the sleeve.

Further assuming that a penny will be the next to pass under the roller 13, the sleeve 32 will be shifted to bring the segmental gear into mesh with the fourth spur gear 61 loosely mounted upon shaft 43 and which meshes with a gear 62 fast upon the shaft 52 and which has a two toothed disk 63 secured thereto; said toothed disk 63 being adapted to slightly rotate gear 60 and through gears 48 and 46 imparting a similar rotation to the cash registering shaft 45. The locking gears of this train are 63$^a$ and 63$^b$ with the locking arm 63$^c$ having a concave end which becomes unlocked through the proper slot in sleeve 32.

Now if a 78¢ token or a 25¢ piece should be brought under the roller 13, the segmental gear 33 would be shifted into mesh with the fifth spur gear 64 loosely mounted on shaft 43 and which meshes with a gear 65 loosely mounted upon shaft 52. The gear 65 is provided with an elongated hub having another gear 66 thereon which meshes with a locking gear 67 having a locking arm 68 provided with a concave end normally in engagement with the sleeve 32 but which comes opposite an arcuate slot in the sleeve when the gears 33 and 64 are brought into mesh whereby the train of gears becomes unlocked. The gear 66 meshes with an idler gear 69 loosely mounted upon shaft 57, the gear 69 operating a gear 70 secured upon a shaft 71 journalled in the gear casing and which gear operates the 25¢ and 78¢ token register.

Now if a nickel passes under the roller 13, the segmental gear 33 will be shifted into mesh with the sixth spur gear 72 which is loose upon the shaft 43 and which meshes with the aforementioned gear 47 on the cash registering shaft 45 for operating the same and the cash register.

Now if a 90¢ token should pass under the roller 13, the segmental gear 33 would be shifted into mesh with the seventh spur gear 73 upon shaft 43. The gear 73 is loose upon shaft 43 and meshes with a gear 74 secured upon a shaft 75 which operates the 90¢ token register. The gear 74 is provided with an elongated hub having a second gear 76 which meshes with a locking gear 77 loosely mounted upon shaft 43 and provided with a locking arm 77$^a$ that normally engages the sleeve 32 but which becomes unlocked through the alinement of an arcuate slot in the sleeve.

The end of the sleeve 32 is provided with a locking segment 78 (Figures 6 and 10) that passes into and out of different grooves or notches in an interlocking member 79 (Figure 9) so that the sleeve cannot be shifted while a train of gears is being operated. After the train of gears has been operated and the segmental gear 33 passes out of mesh with the gear with which it has been in mesh, the locking segment will pass out of engagement with its notch in the member 79. At this time the cam 16 will have rotated through a dwell and will be in position to actuate the ratchet bar 19 and lever 21 to return or shift the sleeve 32 to its initial starting position. The mechanism is so timed that the lever 21 is in initial starting position when a coin is passing under the roller 13 and the sleeve 32 is in the position shown in Figure 6. It is therefore evident that the mechanism is so timed that the sleeve 32 will be shifted into engagement with the proper gear train, locked in such position while the train of gears is being operated, released after operation of the train of gears, and restored to initial position by the time another token has actuated the roller 13.

The foregoing described mechanism forms the subject matter of the said copending application. This invention primarily concerns itself with a unit fare registering mechanism which is operatively associated with the other registering mechanism and which co-operates with the aforedescribed mechanism to provide a fare box that registers the cash, the number of tokens and the number of fares to provide a check upon the conductor.

In accordance with the foregoing, mechanism has been provided which is operatively associated with the registering mechanism for controlling certain mechanism actuated by the main driving shaft; the latter mechanism registering the number of fares paid.

In referring to Figures 12, 15 and 16, there is shown a small spur gear 81 secured upon a shaft operatively associated with the aforedescribed cash registering mechanism. This may be the previously described shaft 45. It will be understood that the gear 81 will be partially or wholly rotated according to whether a penny, a nickel or a dime has been registered; the latter imparting a total rotation to the gear 81. This gear 81 meshes with a spur gear 82 journalled upon a screw bolt 83 extending from a plate 84 suitably supported in the casing. A second larger spur gear 85 is also journalled upon the screw bolt 83 and is suitably connected to the gear 82 and may constitute a part thereof. The gear 85 meshes with a spur gear 86 having an extended hub which is journalled upon a screw bolt 87 extending from the supporting plate 84. A larger spur gear 88 is secured to the inner end of said hub and a disk 89 is integral with the outer end of said hub. A gear disk 90 having a single tooth is secured to the disk 89 and is designed to rotate one revolution for one fare. The gears intermediate said gear 90 and gear 81 are timed so that while the latter makes one revolution for every ten cents the gear 90 will make one revolution for one fare whether that fare is six cents, seven cents or any suitable number of cents. The gear 88 meshes with a gear 91 secured upon a shaft 92 journalled in a U-shaped bracket 93 attached to the gear casing 94 and having a depending lug 95. A bevel gear 96 is also secured upon the shaft 92 and meshes with a bevel gear 97 secured upon the lower end of a vertical shaft 98 journalled in the arms of the bracket 93. A gear 99 is secured upon the upper part of the shaft 98 and meshes with a gear 100 (Figure 12) loosely journalled upon a rotatable housing 101. A ratchet wheel 102 is secured to the upper side of the gear 100 (Figure 26) and a pawl 103 secured upon the upper end of a rod 104 coacts with the ratchet wheel. The teeth of the ratchet and the tooth on the pawl are sufficiently bevelled so that rotation of the gear 100 will force the pawl out of engagement with the ratchet. This pawl and ratchet serves as an overthrow preventer for and controls the rotation of the shaft 98 which actuates a penny indicator or accumulator 105 (Figure 2) which will be later described.

Referring to Figures 15, 16 and 18, it will be observed that the single toothed gear 90 periodically imparts rotation to a pinion 106 journaled upon a pivot bolt 107 (Figure 18) supported by and extending from the fare box casing. The gear 106 meshes with a gear 108 loosely mounted upon a stub shaft 109 (Figure 18) extending from and supported by the casing. An accumulating gear 110 having lateral teeth is loosely mounted on the outer end of shaft 109 and retained by a suitable end collar or head on the shaft. This gear 110 has a missing tooth for a purpose to be later set forth. A disk 111 having a single notch in the periphery thereof is loosely mounted adjacent the inner side of gear 108, and a disk 112 is loosely mounted adjacent said disk 111. The disk 112 is provided with a pair of teeth 112ª (Figure 19) forming a recess therebetween in which the teeth of a Geneva gear 113 are adapted to fit. The gears 108, 110 and disk 112 are connected for conjoint rotation by the dowel pin 114. Adjacent the disk 112, there is a gear 115 also loosely mounted upon the stub shaft, and this gear meshes with the Geneva gear 113 and has a limited oscillating movement. The Geneva gear 113 meshes with the notch in the disk 111, the pair of teeth on disk 112 and the gear 115. The alternate teeth of the Geneva gear are cut away sufficiently so that they do not extend to the disk 111 and will not engage therewith. Adjacent the gear 115, there is a disk 116 loosely mounted upon the stub shaft and this disk is connected to the gear 115 by means of the pin 117 for conjoint rotation. An arm 118 (Figure 14) extends from the disk 116 and is adapted to be swung into and out of the path of the tail of a spring actuated pawl 119 (Figures 13 and 14) which forms the operative connection between the fare registering mechanism and a vertical shaft 120 which is rotated by the main driving shaft of the fare box as will later more fully appear. It might be stated at this point that a fare will cause the actuation of the single toothed gear 90 so that it will move the pinion 106 one tooth, thus moving the accumulating gear 110 one tooth. This movement of the gear 110 will rotate the disk 112 which rotates the Geneva gear 113 the distance of one tooth. The Geneva gear 113 will rotate the gear 115 and the disk 116 and swing the arm 118 (Figure 14) out of the path of the tail of the pawl 119 allowing the pawl to engage the shaft 120 and rotate therewith so as to rotate the fare registering mechanism. When the Geneva gear 113 has been actuated one tooth, it will be locked by the disk 111 which will lock the gear 115 and disk 116 from rotation until a reverse rotation of the disk 112 takes place, which will bring the Geneva gear back to initial position. It will be seen that the locking of the Geneva gear 113 will be accomplished by the periphery of the disk 111; the notch therein and said periphery having passed a tooth in said gear which has been cut away, the two whole teeth adjacent said tooth will ride on said periphery and prevent said gear 113 from turning.

Mechanism has been provided for normally locking the accumulating gear 110 and the pinion 106 against rotation. In the exemplification of this invention, a pawl 121 (Fig. 15) is pivoted intermediate its ends upon a shaft 121ª and is normally spring-impelled by a spring 121ᵇ toward the gear 110 to act as an aligner. A second pawl 122, secured intermediate its ends upon the shaft 121ª, has a broad plate member 80 (Figs. 9 and 11) secured thereon which lies in the path of the gear locking arms 55, 68 and 77ª for actuation thereby when a token is registered. The registration of a token will therefore oscillate the shaft 121ª and pawl 122 for rotating the pinion 106 and gear 110 one tooth, said pawl being normally spring-impelled by a spring (not shown) away from engagement with the teeth of the pinion 106. These pawls are provided with tails which lie in the path of a cam 123 secured upon the driving shaft 40 of the fare box. The timing and arrangement of the mechanism is such that the cam 123 will become disengaged from the tails of the pawls at the proper time allowing the pawl 121 to disengage gear 110 when the latter is actuated, and the pawl 122 to actuate the pinion 106 if a token has been registered.

In referring to Figures 12 and 13, it will be noted that the vertical shaft 120 is provided with a gear 124 in mesh with a gear 125 secured upon the driving shaft 40 so that the shaft 120 is constantly rotating during the operation of the fare box which may be either manually or motor driven. The shaft 120 is located adjacent the gear 110 and it is provided with a projecting tooth or stud 126 which is adapted for engaging the gear 110 and returning it to normal position after it has been actuated by the pinion 106. When the gear 110 is in normal position, the missing tooth before mentioned will provide a space directly opposite the shaft 120 so that the stud 126 can pass without actuating the said gear, but as soon as the said gear has been actuated, a tooth will be brought in the path of the stud 126 which will engage the gear 110 and rotate it back to normal position. This reverse movement of gear 110 will cause the reverse actuation of the Geneva gear 113 and the gear 115 which will rotate the disk 116 to swing the arm 118 into the path of the tail of the pawl 119 for shifting the same out of operative position and holding the same in such position.

The upper end of the shaft 120 (Figure 13) is provided with a reduced portion upon which a bearing 127 is secured. This bearing is provided with a collar in which several ratchet teeth 128 (Figure 14) are formed for engagement with the pawl 119, which is pivoted to the inside of the aforementioned housing 101 which in turn is rotatably mounted upon the bearing 127 by means of a ball bearing 129 (Fig. 13); the upper end of said housing being in the form of a tube surrounding the shaft 120 and rotatably supported in a bearing 130; the lower end of said housing being formed by a closing disk 131 forming the support for the pawl.

Above the gear 110 (Fig. 12) there is a projecting stud 132 on the shaft 120. During each rotation of said shaft, the stud 132 is adapted to strike an arm 133 rotatably mounted upon the aforementioned rod 104. The hub portion of this arm is provided with a cam surface that coacts with an upper cam surface upon a collar 134 secured to the rod. A coil spring 135 between a washer on the rod 104 and the hub of the arm 133 yieldingly holds the said arm against the collar 134. When the stud 132 strikes the arm 133, there will be a tendency to rotate the rod 104 so as to properly center the pawl 103 and force the same between a pair of ratchet teeth in order that the shaft 98 will be limited to a definite predetermined rotation. Should, by some chance, the pawl 103 be positioned upon the top of a tooth so as not to be capable of entering a recess, the spring 135 would allow the arm 133 to rise and rotate on the rod 104 as is obvious without injury to the mechanism.

In referring to Figure 13, it will be noted that the tube on the housing 101 extends above the shaft 120 in the form of a socket for receiving the fare registering shaft 136 (Figure 2) and coupling the same thereto. The shaft 136 is housed in a vertical sleeve or hollow column 137 which supports the casing for the fare register "F" at its upper end. The shaft 136 extends through this sleeve and is provided with a gear 138 (Figure 22) at its upper end which actuates the fare registering mechanism, a portion of which is illustrated in Figure 22, but as these registers are old and well known, further description and disclosures seems unnecessary.

At a suitable distance above the fare box, a cylindrical casing 139 is secured upon the column 137 and concentric therewith. This casing is in the form of a hollow shell having end collars provided with apertures for receiving the sleeve 137 to which they are secured. Within the shell, there is a sleeve 140 rotatably mounted upon the column 137 and sustained by a collar 141 secured to the column. The lower end of the sleeve 140 is provided with gear teeth 142 whereby rotation may be imparted thereto through the instrumentality of a gear 143 secured to a small vertical shaft 144 having its upper end journalled in the lower collar of the shell and having its lower end coupled to the upper end of shaft 98 (Figures 12 and 16). Upon the sleeve 140 there is secured the aforementioned penny indicator 105 in the form of a drum having a central web with flanges that surround the sleeve. This drum has an outer surface with numerals, preferably from 0 to 5, imprinted thereon upon its upper and lower halves and these numerals are exposed to view through a pair of windows 145. This structure constitutes the indicator for the penny accumulation in that it shows the number of pennies that have not been recorded as fares. For example, assuming that the fare is six cents, and a ten-cent piece has passed through the fare box, one fare will be recorded on the indicator "F" while the extra four cents will be indicated by the indicator "E".

In Figures 24 and 25, there is illustrated a slight modification. The parts are substantially the same as shown and described in Figures 13 and 15 except that a pawl and ratchet mechanism is substituted for the for the driving pinion 106. In the modified form, a ratchet wheel 108$^a$ is secured to the accumulating gear 110$^a$ which is shown as an ordinary gear. This ratchet wheel is engaged by a pawl 146 yielding pivoted upon a lever 147. This pawl is in the form of a bell crank lever, the pivot of the pawl being at the apex 146$^a$, with one arm engaging the ratchet wheel and the other arm having an inwardly projecting pin slidable in a short arcuate slot 147$^c$ in the lever 147. A spring wire 148 is secured at one end to said pin and looped over the pivot 146$^a$ and anchored at its other end to the lever 147. The arrangement is such that the wire is crossed intermediate the pivots so that the tendency of the spring will draw the pawl inwardly after the actuation of the ratchet, the latter having elevated the point of the pawl to bring the same into position for engaging a first tooth.

The lever 147 is pivoted intermediate its ends upon a pivot 149 and the part of the lever below the stud is of substantially quadrilateral form having a cam engaging projections 150 at its lower outer corner, a second cam engaging portion 151 at the inner lower corner and a third cam projecting portion 152 at the upper inner corner. A cam 153 secured upon the shaft 40 cooperates with the cam engaging portion 150 and a cam 154 secured for rotation with the gear 88 is adapted for engaging the other two cam projections 151 and 152. A holding pawl 155 is mounted upon the stud 149 for engaging the ratchet and preventing reverse rotation thereof. This holding pawl is so connected with the lever 147, preferably by means of a stop 147$^a$ and a spring 147$^b$, that it will swing therewith out of engagement with the ratchet wheel when the said lever is swung to shift the pawl 146 from a ratchet tooth so that the stud 126 on shaft 120 in striking the gear 110$^a$ may return it to normal initial position. The spring 147$^b$ normally presses the pawl 155 against the ratchet 108$^a$.

In this modified form, the gear 81 which is actuated by the cash registering mechanism will actuate the cam 154 through the gears 82, 85 and 86. Each rotation of the cam 154 will record a fare. When the cam 154 rotates into the position shown in Figure 24, the pawls will be in the position shown in Figure 24, the pawl 155 being out of engagement with the ratchet while the end of pawl 146 will be a short distance in the rear of a ratchet tooth. As soon as the cam 154 strikes the cam projection 151, the lower end of the lever 147 will move outwardly, bringing the pawl 155 against the ratchet and shifting the pawl 146 against the forward ratchet tooth through the lost motion connection of the slot 147$^a$. After the cam 154 rides off the projection 151, it will strike the projection 152 and swing the lever 147 in the opposite direction for raising the pawl 155 out of engagement with the ratchet and shifting the pawl 146 away from the engaged ratchet tooth so that the stud 126 on the shaft 120 which will have rotated into engaging position with the gear 110ª may rotate the gear back to initial position for shifting the arm 118 (Figure 14) into the path of the tail of pawl 119. During this interval, the cam 153 will have rotated around into engagement with the cam projection 150 for holding and retaining the lever and pawls in their inoperative position substantially as shown in Figure 24. It will of course, be understood that the cam 153 will ride off the cam projection 150 before the cam 154 comes around again for another actuation.

The operation is as follows:

In the above description, it has already been pointed out how the different tokens are registered and how the coins are registered on the cash register, it now remains to describe how the fares are registered. When a coin is registered on the cash register "A", the gear 81 (Figures 12, 15 and 16) will be rotated. In referring to Figure 15, it will be noted that gear 81 has ten teeth, the gear 82 with which it meshes has 12 teeth, the gear 85 has 20 teeth and the gear 86 that rotates the single toothed gear 90 has 10 teeth. It will therefore be evident that six-tenths of a revolution of gear 81 will rotate gear 85 a half a turn or ten teeth, imparting thereby a complete rotation to the single tooth gear 90 which will actuate the pinion 106 and hence the gear 108 (Fig. 18) and gear 110 the distance of one tooth. As each tooth of gear 81 represents a penny actuation, it will be apparent that each rotation of the single tooth gear will constitute a six-cent fare for which the present fare box is designed.

Assuming that one or more pennies are passing through the fare box, the gear 81 will be actuated one or more teeth, imparting fractional rotations to gears 82, 85, 86, 90, 91, 96, and 143 (Figure 2), the latter of which will rotate the penny indicator to show the number of pennies accumulated. Five pennies may be thuswise accumulated and indicated on the penny indicator; a sixth penny will, however, cause the single toothed gear 90 to complete its revolution and actuate the accumulating gear 110 the distance of one tooth, through the instrumentality of the pinion 106 and gear 108; the penny indicator rotating around to zero.

Rotation of gear 110 will swing arm 118 which normally holds the pawl 119 in an inoperative position out of engagement therewith allowing the spring 119ª to actuate the pawl into engagement with a tooth 128 in the sleeve 127 secured to the shaft 120 which is continually rotating during the operation of the machine, whereby the housing 101 and the shaft 120 become coupled together for conjoint rotation and as the housing 101 is operatively connected to the fare registering mechanism as previously set forth, the fare registering mechanism "F" will be actuated to indicate the fare. The mechanism is so timed that as the shaft 120 is coupled to the housing 101 and is making a rotation to register the fare, the stud 126 thereon will engage a tooth of the gear 110 and rotate the same back one tooth and since there will be no accumulations on the gear 110 on account of the pennies, such rotation will swing the arm 118 into the path of the tail of the pawl 119 which will lift and hold the pawl out of engagement with the shaft 120 when the same has completed a rotation in coupled relation with the housing 101. It will, of course, be understood that when the gear 110 is in normal position, the space defined by the missing tooth will allow the stud 126 to pass but just as soon as gear 110 is rotated one or more teeth, a tooth thereof will be brought into the path of the stud 126.

Now if a nickel be passed through the fare box, the gear 81 would revolve one-half of a revolution or five teeth, and the single toothed gear 90 would make five-sixths of a revolution. The five pennies thuswise accumulated would be indicated on the penny indicator "E". It would hence require another penny actuation to cause the single toothed gear 90 to complete its revolution for actuating the pinion 106 and accumulating gear 110 the distance of one tooth. Now assume that another nickel follows in succession, the gear 81 will complete its revolution, gear 82 will be rotated ten-twelfths of a revolution, and the single toothed gear 90 will complete its revolution and rotate four-sixths of another revolution. The four-sixths of a revolution arising from the four excess pennies over a fare will be indicated by the numeral 4 on the penny indicator. Every revolution of the single toothed gear 90 will rotate the gear 110 the distance of one tooth, and this rotation of gear 110 will swing arm 118 away from the tail of the pawl 119 so that the pawl may couple the housing to the shaft. The Geneva gear 113 will lock the arm 118 out of the path of the pawl 119 and it is necessary for the stud 126 on the shaft 120 to rotate the gear 110 back to normal position to unlock the arm 118 and swing it back into the path of the pawl 119. It is, however, possible to rotate gear 110 two teeth during one rotation of shaft 120. Such movement of gear 110 would rotate the disk 112 completely out of engagement with the Geneva gear 113, so that it would require two rotations of shaft 120 to bring gear 110 back to normal position and to bring the disk 112 back so as to actuate the Geneva gear for unlocking disk 116 and swinging arm 118 back in the path of pawl 119. The gear 110 may hence be said to be accumulative.

In order to explain the accumulative feature of gear 110, it will be asumed that a plurality of dimes, say three, are successively passing through the fare box with the gearing in normal position. The first dime will actuate the accumulating gear 110 one tooth and four pennies will be accumulated upon gear 90 in the form of advanced rotation and will be indicated upon the penny indicator "E". It will require one rotation of shaft 40, assuming the first dime to be under the roller 13, to register one dime and move the accumulating gear 110 and shift the arm 118 out of engagement with the pawl 119. At the end of the first revolution, the pawl 119 will be spring-impelled into engagement with the shaft 120 whereby the fare register becomes coupled to the said shaft for conjoint rotation therewith for registering a fare. During the second rotation of shaft 120, the stud 126 will rotate the gear 110 back to normal position, since the parts are so arranged that the stud 126 has passed through the space of the missing tooth before the accumulating gear 110 is rotated. During this second rotation of shaft 120 which is caused by the second rotation of shaft 40, the second dime will pass through the machine, causing the one tooth gear 90 to complete the advanced revolution, make another complete revolution and a fractional revolution of two-sixths, since the four pennies plus the dime make two fares with two cents in excess. These two cents will, of course, be shown on the penny indicator "E". Since the one toothed gear 90 makes two complete revolutions when the second dime passes through the machine, the accumulating gear 110 will be actuated the distance of two teeth. A movement of two teeth of the accumulating gear 110 will rotate the disk 112 completely out of engagement with the Geneva gear 113, so it will require two reverse actuations by the shaft 120 to bring it back to normal position for actuating the Geneva gear 113 for unlocking the disk 116 and swinging the arm 118 into the path of the pawl 119. Therefore, the housing 101 will remain coupled to the shaft 120 during the third rotation. During the third rotation of shaft 120, the accumulating gear 110 will be moved back one of the two teeth, but the third dime in passing through the fare box will cause the one toothed gear 90 to complete the remaining four-sixths of a revolution and another complete revolution so that the pinion 106, gear 108 and gear 110 will again be moved through a distance of two teeth, thereby turning the teeth on the disk 112 still further away from the Geneva gear. At the end of the third rotation of shaft 120, two of the five fares represented by three dimes or thirty cents will have been registered on the fare register and other three fares are accumulated upon gear 110 in the form of advanced rotation. It will therefore require three more rotations of shaft 120 to register these fares and rotate the gear 110 back to normal position and also bring disk 112 back to normal position for actuating the Geneva gear 113 to unlock the disk 116 and swing arm 118 into the path of the tail of the pawl 119, whereby the tail of the pawl will ride under the arm for disengaging the pawl, providing of course that no more coins in the form of nickels or dimes are passing through the machine. Pennies, however, may follow the three dimes since it requires six rotations of shaft 40 to register six pennies and move the accumulating gear and consequently as an equal number of rotations will be imparted to shaft 120, it will be apparent that the fare registration may catch up while the pennies are passing through the machine. No matter how rapidly or how slowly the gear 90 is operated by the cash register whenever it turns the accumulating gear one step the connection between the shaft 120 and the fare counter F is established and the number of six cent fares are recorded thereon until it has been operated as many times as the gear 90 has made complete turns or until the accumulating gear has been stepped back by shaft 120 as many times as it has been stepped forward by the one tooth gear 90. When a token is registered, the plate member 80 will be actuated by a locking arm to oscillate or fractionally rotate shaft 121$^a$ to operate the pawl 122 for rotating the pinion 106 and gear 110 the distance of one tooth, so each token may be registered as a fare upon the fare register in the same manner as the cash fares.

In the modified form in Figure 24, the operation is the same as above described, the pawl mechanism merely taking the place of the pinion 106.

It is characteristic of this invention that the train of gears that actuates the fare registering mechanism is normally locked from operation, being only released during actuation so that the machine is very accurate. It is further characteristic of this invention that the train of gears that controls the fare registering mechanism is accumulative and may be designed for any fare. It should also be apparent that the fare registration in connection with the penny indicator will greatly aid the inspector in checking up on the conductors.

The accumulation is effected to allow of a greater period of time between the indications of separate fares, thus permitting in an instantaneous register the giving of distinct audible signals and also permitting the convenient observation of the changing figures on the fare register.

We are aware that numerous details of construction may be varied through a wide range without departing from the principles of this invention, and we therefore do not purpose limiting the patent granted otherwise than necessitated by the prior art.

We claim as our invention:

1. In a fare box, the combination with the cash registering mechanism, of a fare register and penny indicator, a driving shaft for said cash registering mechanism, a vertical shaft geared to said driving shaft, a housing rotatably supported on said vertical shaft, a pawl on said housing normally spring-impelled into engagement with said vertical shaft, a rotatable disk having an arm normally holding said pawl out of engagement with said shaft, a gear on said disk, a Geneva gear for operating said gear and locking the same from rotation, means for operating said Geneva gear and penny indicator comprising a train of gears driven by said cash registering mechanism.

2. In a fare box, the combination with the cash registering mechanism, of a fare register, a penny indicator, a shaft, a releasable connection between said shaft and fare register, a member for controlling said connection, a train of gears driven by said cash registering mechanism for operating said member at predetermined times and operating said penny indicator, said train of gears embodying a cumulative gear in proximity to said shaft and operable thereby in a reverse direction.

3. In a fare box, the combination with the cash registering mechanism, of a fare register, a driven shaft, a releasable connection between said shaft and register, a member for controlling said connection, a train of gears connecting said member and cash registering mechanism for operating said member to inoperative position, and means on said shaft for engaging said train of gears for operating said member to operative position.

4. In a fare box, the combination with cash registering mechanism, of a fare registering mechanism, a shaft for operating said fare registering mechanism, a train of gears operatively associated with said cash registering mechanism, and means actuated by said train of gears at predetermined periods for connecting said shaft and fare registering mechanisms.

5. In a fare box, the combination with the cash registering mechanism, of fare registering mechanism, means for operating the latter mechanism comprising a shaft, a clutch for connecting said shaft and fare registering mechanism, and means controlled by the operation of said cash registering mechanism for controlling said clutch.

6. In a fare box, the combination with the cash registering mechanism of a fare registering mechanism, a shaft for operating the latter, means actuated by a train of gears connected to said cash registering mechanism for connecting said shaft and fare registering mechanism at predetermined times responsive to selective cash registrations.

7. In a fare box, the combination with cash registering mechanism, of fare registering mechanism, a shaft, a pawl connected to said fare registering mechanism and adapted for coupling relation with said shaft, a swingable arm for normally holding said pawl in disengaged position, and a train of gears operatively associated with said cash registering mechanism and operative after a predetermined cycle of operation for swinging said arm out of engagement with said pawl.

8. In a fare box, a fare register, a shaft, and means for operatively connecting said shaft and register at predetermined times, a swingable member for controlling said means, and a train of gears for operating said swingable member, said train being adapted to be actuated by the cash inserted in the fare box.

9. In a fare box, the combination with the cash registering mechanism, of a fare register, a shaft, and means for operatively coupling said shaft and register, and a train of gears operated by said mechanism for controlling said means whereby said register may be driven by said shaft in accordance with the operation of said mechanism.

10. In a fare box, the combination with the cash register, of a fare register, a penny indicator, a driving shaft for said fare register, a train of gears driven by said cash register for operating said penny indicator, a connection between said shaft and fare register and controlled by said train of gears.

11. In a fare box, the combination with the cash registering mechanism, of a fare register, a driven shaft, a releasable connection between said shaft and fare register, and means embodying a train of gears driven by the cash registering mechanism for releasing said connection.

12. In a fare box, the combination with the cash registering mechanism, of a fare register, a driven shaft, a releasable connection between said shaft and fare register, a swingable member for controlling said connection, a train of gearing connected to said member, said gearing being operatively connected to said cash registering mechanism for swinging said member into an inoperative position, and means on said shaft for operating a part of said gearing for swinging said member into operative position.

13. In a fare box, the combination with the cash registering mechanism, of a fare register, a fractional fare indicator, a driving shaft, a releasable connection between said shaft and fare register, and a train of gears driven by the cash registering mechanism for controlling said connection and operating the fractional fare indicator.

14. In a fare box, the combination with the cash registering mechanism, of a fare register, a driven member, a releasable connection between said fare register and said driven member, a movable member for controlling said releasable connection, a train of gears actuated by said cash registering mechanism, and a connection between said gear train and controlling member for moving said member upon a fare actuation of said gear train.

15. In a fare box, the combination with the cash registering mechanism of a fare register, a driven member, a releasable connection between said fare register and driven member, and means actuated by said cash registering mechanism for controlling said connection.

16. In a fare box, the combination with the cash registering mechanism, of a fare register, a driven member, a releasable connection between said driven member and fare register, a movable member for releasing said connection, and a train of gearing operated by said cash registering mechanism for moving said member to releasing position and locking the same.

17. In a fare box, the combination with the cash registering mechanism, of a fare register, a driven member, a releasable connection between said driven member and fare register, a movable member for controlling said connection, and a train of gearing operated by said cash registering mechanism, said train of gearing being effective for moving and locking said movable member in inoperative position, and said driven member being effective for rotating a part of said gear train for moving said movable member to operative position.

18. In a fare box, a fare register, a driven member, a releasable connection between said register and member, a movable member for controlling said connection, a train of gearing embodying an accumulative gear, a connection between said accumulative gear and movable member, said last-named connection being effective for moving said movable member and locking the same in inoperative position, means on said driven member for actuating said accumulative gear for unlocking said movable member and moving it to operative position, and means for driving said train of gears.

19. In a fare box, a fare register a driven member, a releasable connection between said register and driven member, a movable member for normally holding said connection in released position, fare actuated means for shifting said movable member to inoperative position, and fare actuating means for shifting said movable member to operative position.

20. In a fare box, a fare register, a driven member, a releasable connection between said register and member, an accumulating gear, a train of gears for intermittently driving said accumulating gear, a movable member operatively connected to said accumulating gear for controlling said connection and disengagable therefrom when in inoperative position, and means associated with said driven member for reversely rotating said accumulating gear for reestablishing the operative connection between said accumulating gear and movable member for shifting the latter to operative position.

21. In a fare box, the combination with the cash registering mechanism, of a fare register, a driven member, a releasable connection between said register and member, an arm normally holding said connection in inoperative position, an accumulating gear, means actuated by said accumulating gear for swinging said arm to inoperative position and locking the same in such position, and means for actuating said accumulating gear in a reverse direction for releasing said arm and shifting the same to operative position.

22. In a fare box, a fare register, a cash registering mechanism, a train of gears driven by said registering mechanism and comprising an accumulating gear actuatable a distance of one tooth for every fare registered on said mechanism, a driven member, a releasable connection between said register and driven member, means for reversely rotating said accumulating gear, and means controlled by the rotations of said accumulating gear for governing said releasable connection.

23. In a fare box, the combination with the cash registering mechanism, of a fare register, a driven member, a releasable connection between said fare register and driven member, a movable member for controlling said connection, an accumulating gear, a train of gears connecting said cash registering mechanism and accumulating gear for intermittently rotating the same a predetermined amount, a connection between said accumulating gear and movable member for moving the latter into inoperative position, and means on said driven member for reversely rotating said accumulating gear for the purpose described.

24. In a fare box, the combination with the cash registering mechanism, of a fare register, a forwardly driven member, a connection adapted for connecting said driven member and register, and means reversely operated by said driven member and cash registering mechanism for controlling said connection.

25. In a fare box, the combination with the cash registering mechanism, of a fare register, a driven member, a releasable connection between said register and driven member, an accumulating gear, a train of gears connecting said accumulating gear and cash registering mechanism and effective for actuating said accumulating gear a predetermined distance for every fare registered, and means controlled by the position of said accumulating gear for governing said releasable connection.

26. In a fare box, the combination with the cash registering mechanism, of a fare register, an accumulating gear operatively connected with said cash registering mechanism and rotatable a predetermined extent for every fare registered on said mechanism, a driven member connected to said fare register for registering the fares indicated upon said accumulating gear, and means for releasing the connection between said fare register and driven member when the last fare indicated on said accumulating gear has been registered.

27. In a fare box, the combination with the cash registering mechanism, of a fare register, a driven member, a connection adapted for coupling said driven member and fare register, an accumulating gear geared to said cash registering mechanism and intermittently operated thereby in one direction a predetermined extent, and intermittently operated in the other direction by said driven member, and means controlled by the operations of said gear for controlling the connection between said driven member and fare register.

28. In a fare box, the combination with the cash registering mechanism, of a fare register, an accumulating gear connected to said mechanism and intermittently rotated thereby a predetermined extent for every fare registered on said cash registering mechanism, and a driven member automatically connectable to said fare register when there are fare accumulations upon said gear and automatically disconnectable therefrom when there are no accumulations upon said gear.

29. In a fare box, the combination with mechanism for registering cash and tokens, of a fare register, and trains of gears connecting said mechanism and register comprising a releasable connection, and an accumulating gear for controlling said connections.

30. In a fare box, the combination with mechanism for registering cash and tokens, of a fare register, driving mechanism, a releasable connection between said register and driving mechanism, and accumulative gearing connecting to the first mechanism for controlling said connection.

In testimony whereof, we have hereunto subscribed our names.

HUGO J. BAUR.
ERNEST H. THOMPSON.